United States Patent [19]

Bill et al.

[11] 4,334,207
[45] Jun. 8, 1982

[54] LINEAR DISPLACEMENT TRANSDUCER

[75] Inventors: Colin S. Bill, Birmingham; Charles P. Cockshott, Coventry; John H. Francis, Birmingham, all of England

[73] Assignee: Lucas Industries Limited, Birmingham, England

[21] Appl. No.: 51,243

[22] Filed: Jun. 22, 1979

[30] Foreign Application Priority Data

Jun. 28, 1978 [GB] United Kingdom ............... 28176/78
Dec. 2, 1978 [GB] United Kingdom ............... 46993/78
Mar. 1, 1979 [GB] United Kingdom .................. 797245

[51] Int. Cl.³ ............................................. H01F 21/06
[52] U.S. Cl. .................................................... 336/136
[58] Field of Search ..................................... 310/12–14, 310/15; 336/136, 120

[56] References Cited

U.S. PATENT DOCUMENTS 2,438,359  3/1948  Clapp ........................... 336/136 UX
3,128,441  4/1964  Johnson et al. ................. 336/136 X
3,376,533  4/1968  Chass ............................... 336/136

Primary Examiner—Donovan F. Duggan

[57] ABSTRACT

A linear displacement transducer includes a first elongated magnetizable member having first and second pole pieces which extend parallel with each other over the full length of said first member and which are of substantially constant width along their length. A first winding is wound around part but not all of said first member, a second winding is wound around the full length of the first member. A second elongated member having at least a part which is shorter than said first elongate member is movable linearly relative to the first member in a direction parallel with the longitudinal axis of the first member, such that a substantially constant gap is maintained between the members, to vary the magnetic coupling between the first and second windings when an a.c. signal is applied, in use, to one of the windings.

13 Claims, 6 Drawing Figures

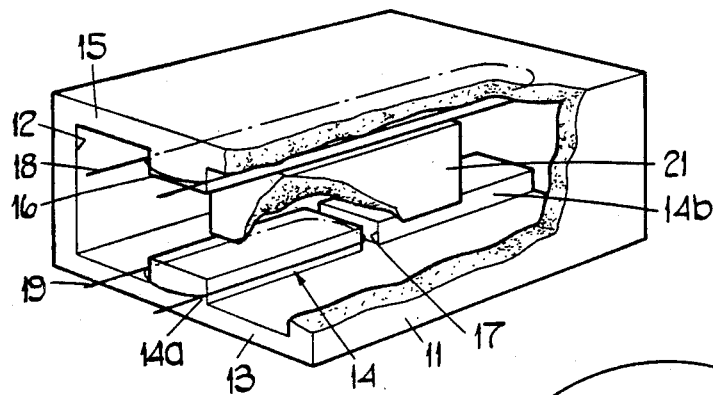

LINEAR DISPLACEMENT TRANSDUCER

This invention relates to a linear displacement transducer.

One known form of linear displacement transducer includes a non-magnetizable cylindrical spool having a bore therethrough and on which are wound three coils abutting axially. The assembly so formed is housed in a hollow cylindrical yoke having end brackets which are provided with holes coaxial with the bore in the spool. The yoke end brackets are formed of magnetizable material. The central coil forms a primary winding, while the two outer coils form secondary windings and may be connected in series opposition. The arrangement thus described forms the stator of the transducer. In addition, the transducer includes a cylindrical slider which is formed of magnetizable material and is approximately the same length as the primary winding and one secondary winding of the stator. The slider is movable linearly within the bore of the stator and, in use, an a.c. signal is supplied to the primary winding so that, depending upon the linear position of the slider, magnetic flux can flow between the primary and secondary windings. A voltage is thereby induced in the secondary winding dependent upon the magnetic flux flow and hence on the linear displacement of the slider from a datum position in which the slider is centrally disposed relative to the primary winding.

The known transducer described in the preceding paragraphs suffers from the disadvantage that, since the end brackets are spaced apart in the direction of movement of the slider, an air gap of varying dimensions is defined between the slider and the end bracket as the slider moves relative to the stator. This varying air gap alters the reluctance of the magnetic path between the end brackets and hence the output from the transducer varies non-linearly with the displacement of the slider. An object of the present invention is therefore to provide a linear displacement transducer which produces a substantially linear output.

Accordingly, the invention resides in a linear displacement transducer including a first elongated magnetizable member having first and second pole pieces which extend parallel with each other over the full length of said first member, and which are of substantially constant width along their length, a first winding wound around part but not all of said first member, a second winding wound around the full length of the first member, and a second elongated member having at least a part which is shorter than said first elongate member, said first and second members being movable linearly relative to each other in a direction parallel with the longitudinal axis of the first member, while maintaining a substantially constant gap between the members, to vary the magnetic coupling between said first and second windings when an a.c. signal is applied, in use, to one of the windings.

In the transducer described in the preceding paragraph, there is a substantially constant air gap between the first and second members throughout the whole range of movement of the two members relative to each other and hence, when an a.c. signal is supplied to said one winding, the voltage induced in the other winding will vary substantially linearly over said range of movement.

Preferably, the first elongated magnetizable member is formed with a longitudinally extending bore in which said second member is mounted.

More preferably, each of said first and second pole pieces is defined by longitudinally extending rib projecting into said bore.

Alternatively, each pole piece is defined by an upstanding wall of a generally planar first member and said second member is mounted above the free end surfaces of said walls.

Alternatively, the second member is defined by a hollow sleeve mounted around the first member.

Conveniently, the second elongated member is composed of an electrically conductive, non-magnetic material so that in use, depending on the relative positions of the first and second members, eddy currents are induced in the second member to modify the flux between the windings.

More preferably, the second elongated member is comosed of a magnetizable material so that, in use, depending on the relative positions of the first and second members, magnetic flux can flow through said second member to magnetically couple said windings.

Preferably, the area of overlap between said first and second members remains substantially constant over the whole range of relative linear movement of the members.

Preferably, the first magnetizable member defines a stator and the second member defines a slider movable relative to the stator.

Preferably, said second winding is wound round the full length of one of said first and second pole pieces of said first member and defines a primary winding to which, in use, said a.c. signal is applied.

Conveniently, said second winding is wound around the full length of said first pole piece so that the first and second windings are provided on the same pole piece of said first member.

Alternatively, said second winding is wound around the full length of said second pole piece so that the first and second windings are provided on different pole pieces of said first member.

Conveniently, a third winding is provided on a further part of said first member so that said third winding is spaced apart in said direction from the said first winding.

In the accompanying drawings.

FIG. 1 is a perspective view, partly cut away, of a linear displacement transducer according to a first example of the invention.

FIG. 2 is an end view of a transducer according to a modification of the first example.

FIGS. 3 and 4 are perspective views of transducers according to second and third examples respectively of the invention.

Figure 5:
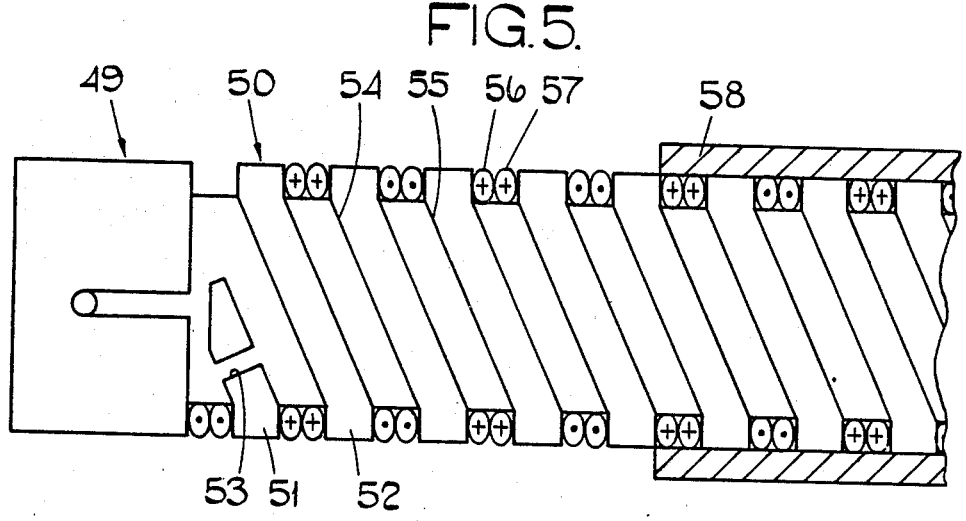
FIG. 5 is a sectional view of part of a transducer according to a fourth example.

Referring to FIG. 1, the transducer of the first example includes a hollow, elongated stator 11 which is formed of a magnetizable material such as steel or ferrite. The bore 12 in the stator 11 is of generally rectangular cross-section and is formed at one of its wider side walls 13 with an integral, centrally disposed, projecting rib 14 which is of constant width and extends parallel with the longitudinal axis of the bore 12 along the full length of the stator 11. Projecting from the opposite wider side wall 15 of the bore 12 is a further, centrally disposed, integral rib 16 which again is of constant width and extends parallel with the axis of the bore 12 along the full length of the stator 11. The ribs 14, 16 define first and second pole pieces respectively of the stator, with the first pole piece 14 being divided midway between its ends into first and second parts 14a, 14b respectively by a narrow gap 17. Wound around the full length of the second pole piece 16 is a primary winding 18, while a secondary winding 19 is wound around the first part 14a of the first pole piece 14.

Mounted in the bore 12 between the free end surfaces of the pole pieces 14, 16 is a rectangular section slider 21 also formed of a magnetizable material such as steel or ferrite. The length of the slider 21 is approximately equal to the length of the pole part 14a plus the gap 17, while the width of the slider is at least equal to the width of the free end surfaces of the pole piece 16 and the part 14a. The slider 21 is capable of linear movement along the bore 12 in a direction parallel with the longitudinal axis of the bore from a datum position in which the one end of the slider is located at the outermost end of the pole piece 14a to a limit position in which said one end of the slider is located at the innermost end of the part 14a. Thus, throughout this permitted movement, the full length of the slider is aligned with the pole piece 16 while a variable non-zero amount of the slider is aligned with the pole piece part 14a. Moreover, the arrangement is such that the slider 21 remains at a fixed distance from the free end surfaces of the pole pieces 14, 16 as it moves relative to the stator and hence a constant air gap is defined between the slider 21 and the pole pieces 14, 16 during the permitted linear movement of the slider. In addition, since the gap 17 is narrow the area of the slider aligned between the pole pieces 14, 16 remains substantially constant throughout the linear movement of the slider.

In use, an a.c. signal from a constant voltage, square wave oscillator (not shown), conveniently operating at a frequency of 6 KHz, is applied to the primary winding 18 so that magnetic flux flow from the pole piece 16 by way of the slider 21 to the pole piece part 14a. A voltage is thereby induced across the secondary winding 19 and is detected by a precision rectifier and a smoothing circuit so that a d.c. output is obtained. The magnitude of this output depends on the magnetic flux linkage between the windings and, since the air gap between the slider 21 and the pole pieces remains constant, is directly proportional to the linear displacement of the slider from said datum position.

As an alternative to the example described above, the slider 21 may be formed of a non-magnetic electrically conductive material such as copper or aluminium. In this case, when an a.c. signal is applied to the primary winding 18 and the slider 21 is moved linearly relative to the stator 11, the magnetic field set up by the alternating current flow through the winding 18 induces eddy currents in the slider 21 and these eddy currents disturb the flow of flux through the stator between the pole pieces 14, 16. A voltage is thereby induced across the secondary winding 19 and is detected as before to produce an output which varies substantially linearly with the linear displacement of the slider from said datum position.

As a further alternative, the relative disposition of the primary and secondary windings can be varied from the arrangement shown in FIG. 1. Thus, with the secondary winding 19 on the pole piece part 14a, the primary winding 18 can be wound around the entire length of the first pole piece 14 (i.e. around both parts 14a, 14b) or around the entire length of the or each narrower side wall of the bore 12. Moreover, with the primary winding in the position shown, the secondary winding 19 can be wound around half of the or each shorter side wall of the bore 12.

Moreover, it is to be appreciated that the length of the slider 21 need not approximate to the sum of the length of the first pole piece 14a and the cap 17. Thus, the slider 21 can be longer than the combined length of the part 14a and the gap 17 provided it is shorter than the overall length of the stator 11. However, with this arrangement the permitted range of movement of the slider is reduced as compared with the above example since the range of movement now corresponds to the distance between a datum position where the one end of the slider is located at the outermost end of the pole piece part 14a and a limit position in which the other end of the slider is located at the outermost end of the pole piece part 14b. Alternatively, the length of the slider 21 can be less than the combined length of the part 14a and the gap 17 provided it exceeds the length of the gap 17 alone. Again, however, the range of movement of the slider is reduced since its two extreme positions now correspond respectively to where one end of the slider is aligned with the innermost end of the pole piece 14b and where the other end of the slider is aligned with the outermost end of the part 14a.

Referring to FIG. 2, in a modification of the first example, the transducer is similar to that shown in FIG. 1 except that the hollow, elongated stator, now indicated at 22, is of right cylindrical cross-section. The wall of the bore in the stator is formed integrally with first and second diametrically opposed, projecting ribs 23, 24 respectively which are of constant width and have their free end surfaces lying on a common imaginary cylinder co-axial with the statorf 22. As in the previous example, the rib 23 extends along the full length of the stator to define a second pole piece around which is wound a primary winding 25. The rib 24 also extends along the full length of the stator to define a first pole piece which is again divided into two parts by a central narrow gap (not shown). A secondary winding 26 is wound around one part of the second pole piece.

Mounted in the bore in the stator 22 is a cylindrical slider 27 of circular cross-section with the axis of the slider being co-extensive with the axis of the stator 22. As before the slider may be formed of a magnetizable material, such as steel or ferrite, or a non-magnetic electrically conductive material, such as copper or aluminium. The length of the slider is the same as in the previous example and again the slider is arranged to move along the axis of the bore so that, in use, when an a.c. signal is supplied to the primary winding 25, an output is obtained which varies substantially linearly with the linear displacement of the slider.

It is to be appreciated that the alternative positions for the primary and secondary windings of the transducer of the first example can also be employed with the transducer shown in FIG. 2.

Referring to FIG. 3, the transducer of the second example includes an elongated stator 29 agained formed of magnetizable material, such as steel or ferrite, but now being of E-shaped cross-section. The central limb 30 and the two outer limbs 31, 32 of the stator are each of constant width and define first, second and third pole pieces respectively, the central limb 30 being divided by a narrow gap mid-way between its ends into first and second parts 30a, and 30b respectively. Wound around the full length of the limb 30 is a primary winding 34, while a secondary winding 35 is wound around the first part 30a of the limb 30. A generally rectangular magnetizable slider 36 is movable linearly parallel with and along the free ends of the limbs of the stator 31 to vary the magnetic flux linkage between the primary and secondary windings. Again any air gap between the slider 36 and the stator 31 remains substantially constant so that a substantially linear output dependent upon slider displacement can be obtained.

Referring to FIG. 4, in the transducer of the third example, the stator 14 is again formed of a magnetizable material, such as steel or ferrite, but now is of generally channel configuration with its side walls being of constant width and defining first and second pole pieces 44, 42 respectively of the stator. Extending around the full length of the first pole piece 42 is a primary winding 43, while the second pole piece 44 is divided into first and second parts 44a, 44b respectively by a narrow gap 45. Wound around the first part 44a of the pole piece 44 is a secondary winding 46.

Mounted for linear movement above the open end of the channel 47 in the stator 41, and in a direction parallel with the longitudinal axis of the channel, is a rectangular section slider 48 again formed of a magnetizable material such as steel or ferrite. As before, the slider 48 remains at a fixed distance from the free end faces of the pole pieces 42, 44 as it moves relative to the stator and hence a constant air gap is defined between the slider 48 and the pole pieces 42, 44 during the permitted linear movement of the slider. Thus, in use, the transducer produces an output which varies substantially linearly with the linear displacement of the slider.

As an alternative to the third example, the slider 48 can be of trapezoidal configuration with the major base dimensions of the slider extending along and projecting from the pole piece 42 such that, as the minor dimension moves relative to the pole piece 44 to perform the function of the slider of the previous example, the whole of the pole piece 42 is always covered by part of the said major base. In addition a further secondary winding separate from the winding 46 may be wound around the second part 44b of the pole piece 44 with the two secondary windings being wound in series opposition to provide improved sensitivity. Using this arrangement it is to be appreciated that a zero output will be obtained when the slider is in its central position with the linear variation in output being of positive slope for displacement of the slider in one direction from the central position and of negative slope for displacement in the opposite direction from the central position.

Referring to FIG. 5, the transducer of the fourth example includes a generally cylindrical rod 49 which defines the stator of the transducer and is formed of steel or a ferromagnetic synthetic resin or synthetic rubber. Machined in the cylindrical surface of the rod 49 is a two-start helical thread 50 so that the thread projections define first and second helical pole pieces 51, 52 respectively separated by two helical slots 54, 55. A primary winding 56 defined by 15 turns of 40 s.w.g. enamelled copper wire is wound around the full length of the first pole piece 51 by introducing the wire into the slot 54 by way of a gap 53 at one end of thread 50 and then winding the wire along the slot 54 to the other end of the thread 50. At the other end of the thread, the wire is introduced through a further gap (not shown) in the thread into the slot 55 and is then wound along the slot 55 back to said one end of the thread. The whole operation is then repeated a further 14 times to produce the required 15 turn primary winding 56. A secondary winding 57, again produced from 15 turns of 40 s.w.g. enamelled copper wire is also wound on the first pole piece 51 but each turn of the winding 57 only extends along the slot 54 as far as a short cental gap in the thread 50 before returning along the slot 55 to said one end of the thread. A further secondary winding (not shown) may, however, be wound between the central gap and the other end of the thread.

Mounted as a close sliding fit on the rod 49 is a hollow magnetizable sleeve 58 which, when the primary winding 56 is connected to an a.c. supply, is moved linearly along the rod 49 to vary the magnetic flux linkage between the primar and secondary windings. Thus, as in the previous examples, a signal is induced in the secondary winding which is rectified to produce a d.c. output varying substantially linearly with the displacement of the sleeve 58.

Figure 6:
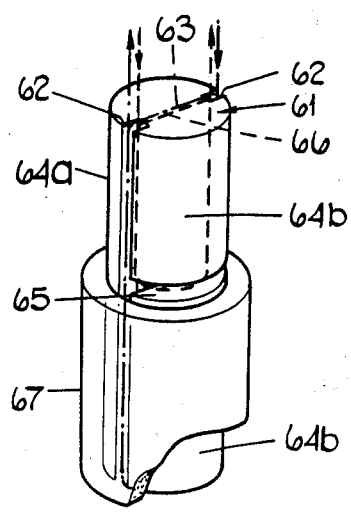
FIG. 6 is a perspective view, partly cut away, of a transducer according to a fifth example.

In the fifth example shown in FIG. 6, the transducer includes a first magnetizable member in the form of a cylindrical body 61 having a pair of axially extending diametrically opposite slots 62, which divide the body 61 into first and second diametrically opposite pole pieces 64a, 64b respectively. The slots 62 extend the full length of the body 61 and have wound therein a primary winding 63, such that each convolution of the winding lies in a plane parallel with the axis of the body 61 and extends completely around the body. A further circumferential slot 65 is formed in the body 61 half way along its length and extends between the axially extending slots 62. A secondary coil 66 is wound along the slots 62 and through the circumferential slot 65 so as to extend over half of the primary winding 63. As in the previous example a second magnetizable member 67 in the form of a hollow cylinder is mounted for movement along the body 61, the length of the member 67 being such that in one extreme position it completely covers the region of the body 61 carrying the secondary winding 66, while in the other extreme position it completely uncovers said region of the body. It will, however, be seen that the member 67 covers part of the primary winding 63 in all positions.

It is to be appreciated that in each of the examples shown in FIGS. 3 to 6 the slider of the transducer may be composed of a non-magnetic, electrically conductive material.

We claim:

1. A linear displacement transducer including a first elongated magnetizable member having first and second pole pieces which extend parallel with each other over the full length of said first member, and which are of substantially constant width along their length, a first winding wound around part but not all of said first member, a second winding wound around the full length of the first member, and a second elongated member having at least a part which is shorter than said first elongate member, said first and second members being movable linearly relative to each other in a direction parallel with the longitudinal axis of the first member, while maintaining a substantially constant gap between the members, to vary the magnetic coupling between said first and second windings when an a.c. signal is applied, in use, to one of the windings.

2. A transducer as claimed in claim 1, wherein the first elongated magnetizable member is formed with a longitudinally extending bore in which said second member is mounted.

3. A transducer as claimed in claim 2, wherein each of said first and second pole pieces is defined by longitudinally extending rib projecting into said bore.

4. A transducer as claimed in claim 1, wherein each pole piece is defined by an upstanding wall of a generally planar first member and said second member is mounted above the free end surfaces of said walls.

5. A transducer as claimed in claim 1, wherein the second member is defined by a hollow sleeve mounted around the first member.

6. A transducer as claimed in claim 1, wherein the second elongated member is composed of an electrically conductive, non-magnetic material so that, in use, depending on the relative positions of the first and second members, eddy currents are induced in the second member to modify the flux between the windings.

7. A transducer as claimed in claim 1, wherein the second elongated member is composed of a magnetizable material so that, in use, depending on the relative positions of the first and second members, magnetic flux can flow through said second member to magnetically couple said windings.

8. A transducer as claimed in claim 1, wherein the area of overlap between said first and second members remains substantially constant over the whole range of relative linear movement of the members.

9. A transducer as claimed in claim 1, wherein the first magnetizable member defines a stator and the second member defines a slider movable relative to the stator.

10. A transducer as claimed in claim 1, wherein said second winding is wound around the full length of one of said first and second pole pieces of said first member and defines a primary winding to which, in use, said a.c. signal is applied.

11. A transducer as claimed in claim 10, wherein said second winding is wound around the full length of said first pole piece so that the first and second windings are provided on the same pole piece of said first member.

12. A transducer as claimed in claim 10, wherein said second winding is wound around the full length of said second pole piece so that the first and second windings are provided on different pole pieces of said first member.

13. A transducer as claimed in claim 1, wherein a third winding is provided on a further part of said first member so that said third winding is spaced apart in said direction from the said first winding.

* * * * *